Oct. 2, 1934.  W. C. LAUGHLIN ET AL  1,975,109
METHOD AND APPARATUS FOR TREATING SEWAGE
Filed Nov. 23, 1932  2 Sheets-Sheet 1
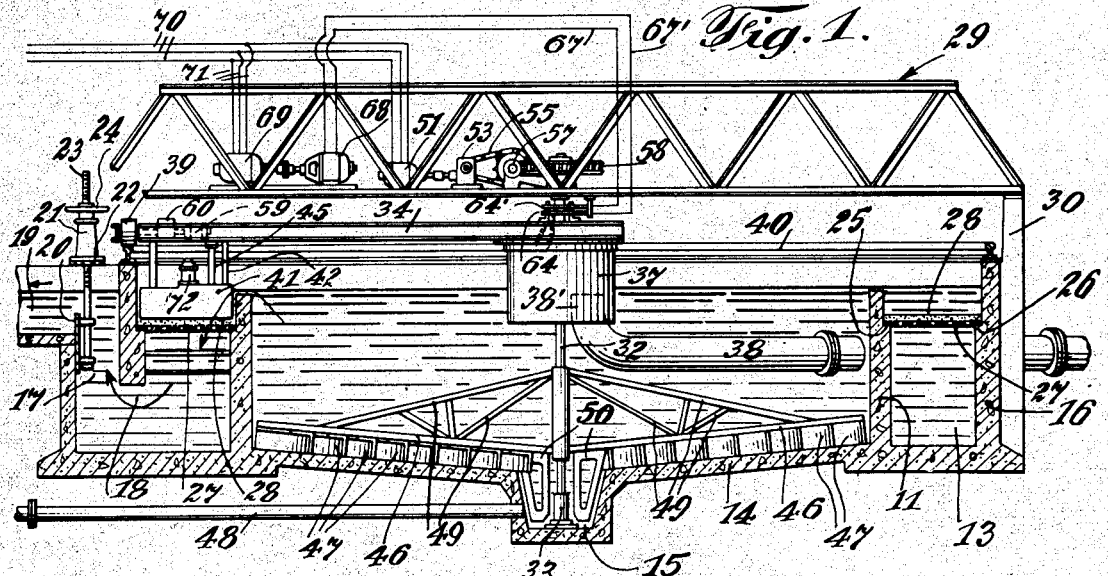
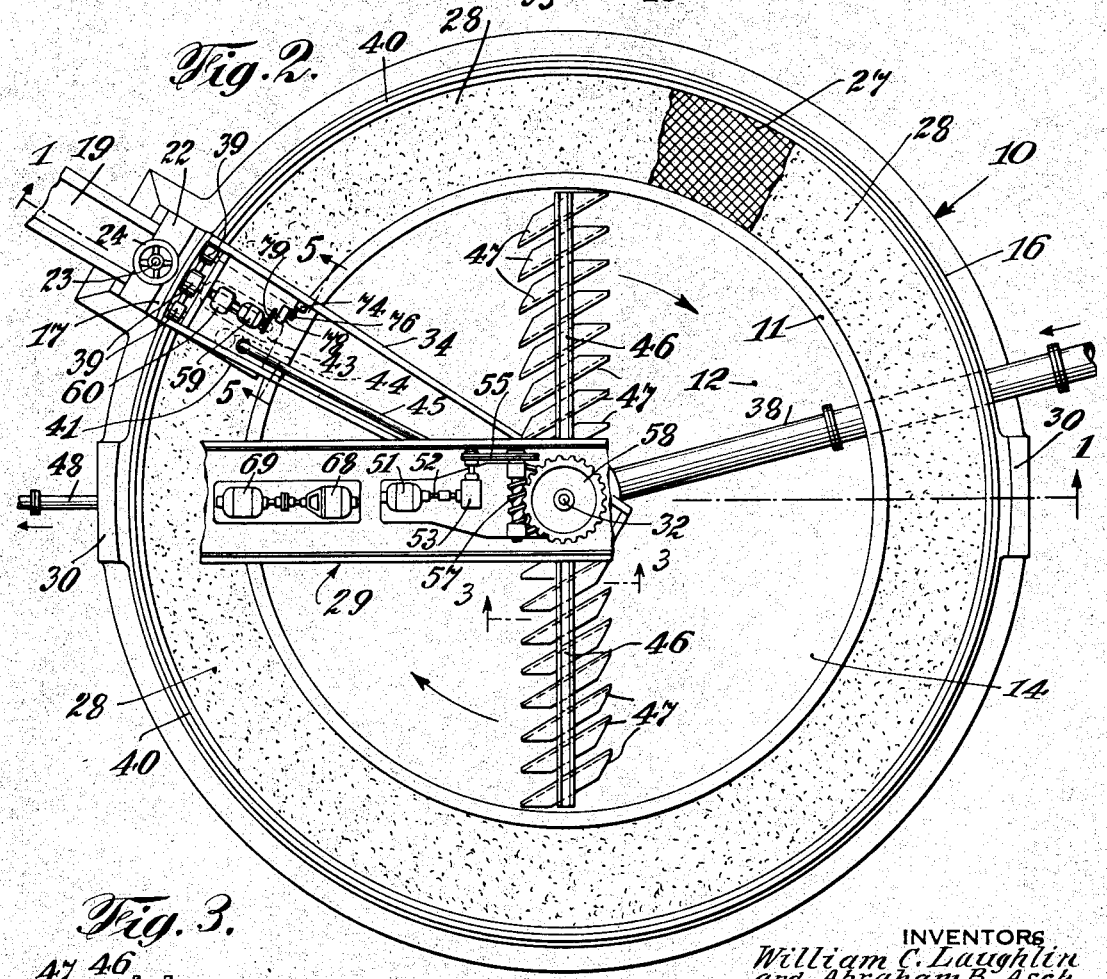
INVENTORS
*William C. Laughlin
and Abraham B. Asch*
BY
*their* ATTORNEY

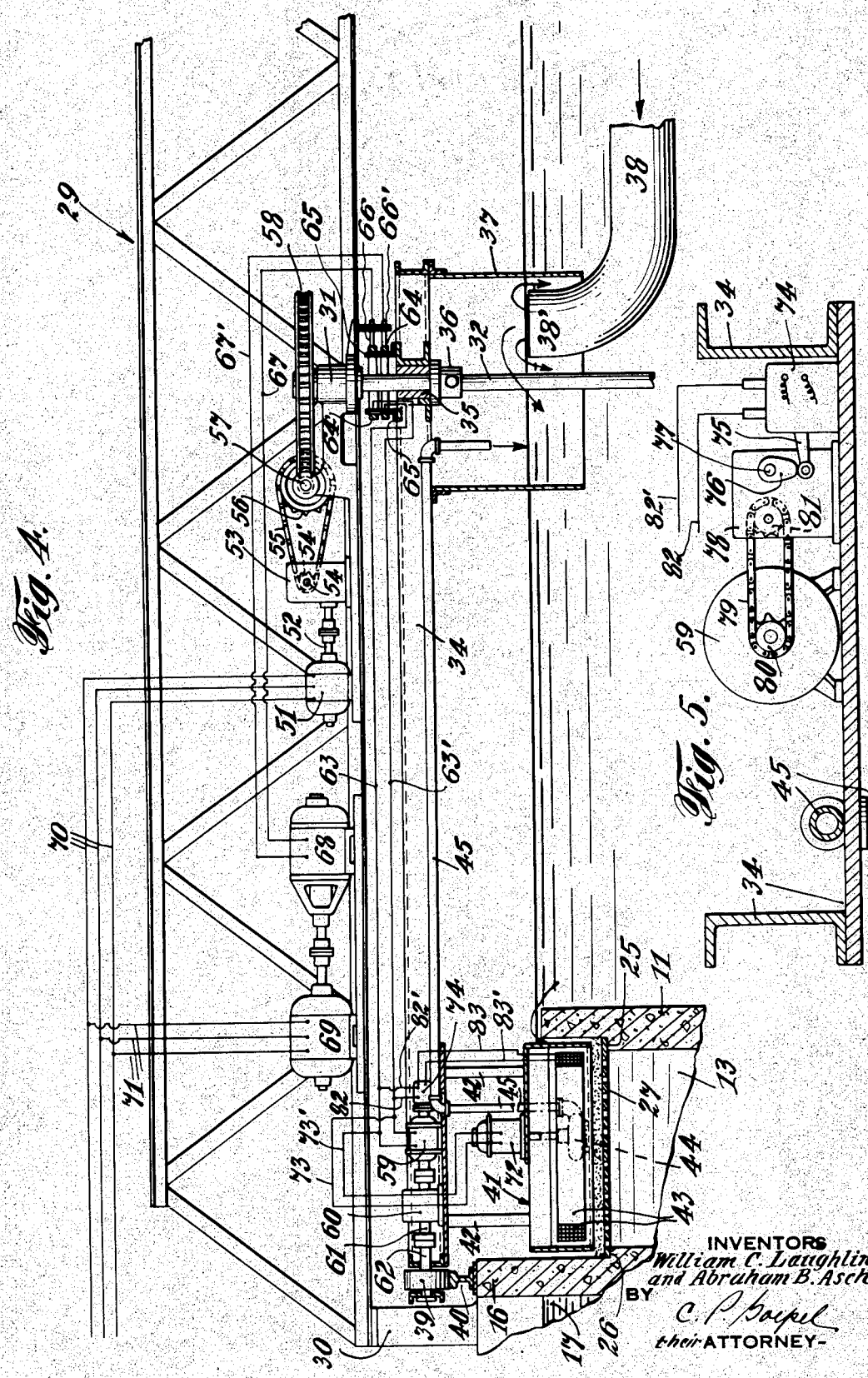

Patented Oct. 2, 1934

1,975,109

UNITED STATES PATENT OFFICE 1,975,109

METHOD AND APPARATUS FOR TREATING SEWAGE

William C. Laughlin, Kew Gardens, and Abraham B. Asch, Brooklyn, N. Y., assignors, by mesne assignments, to Filtration Equipment Corporation, New York, N. Y., a corporation of Delaware Application November 23, 1932, Serial No. 644,018

13 Claims. (Cl. 210—2)

The invention has for its object and purpose the provision of an improved method and apparatus for effecting the separation and removal of heavy matter and sludge settlings from the raw sewage and for filtering the effluent.

One of the objects of our invention is to provide for cities, municipalities, factories and the like, a simple method and construction of means whereby with dispatch and at low cost to transform the output of sewage liquid into a substantially clear effluent. Our invention may be characterized in a general way as the "downward flow" filter system, in contradistinction to those systems in which the fluid to be filtered is required to pass upwardly through a filtering medium. In the present evolvement, the liquid and floatable matter which rises to the top of the clarification chamber overflows into an adjoining canal having a filter bed therein. This canal, at a point below the filter bed, is in communication with the bottom part of an outlet well or channel equipped with an adjustable overflow control gate or weir. The liquid received in the canal from the clarification basin is required to pass downwardly through the filter bed before it can rise into the outlet well for escape over the gate. By vertically adjusting the gate, a difference in level can be maintained between the surface of the liquid in the clarification basin and the top of the gate, so that a thin layer of liquid will overflow from the clarification basin into the canal. Thereby, although the lighter liquid and surface matter are constantly being withdrawn from the surface of the clarification basin, surging is prevented and the sewage liquid within the basin is maintained in a quiescent condition for the solid matter to subside. The sewage liquid is admitted into the clarification basin through a pendant tube which causes the admitted liquid gradually to descend into and spread through the contents of the basin for the subsiding of the heavy matter prior to ascent toward the surface of the lighter water and particles.

The invention also includes as a feature thereof the provision in the canal of a traveling cleaner for washing the material of the filter bed and for removing the water and dirt resulting from the washing operation. With our type of construction in which a machine is constantly traveling in the canal and cleaning the filter bed, there is no clogging of the filter bed and no accumulation of dirt or dirty water therein, with the result that the effluent is kept at maximum clarity.

In furtherance of the objects of the invention, the clarification basin is provided at the bottom thereof with a rotary scraper structure which, without creating any undesirable agitation or surging of the contents of the basin, removes into a sump or depression the solid materials and sludge settlings subsiding upon the bottom of the basin. Such materials are then withdrawn from the sump through a suction pipe.

In carrying our objects forward, it is a further object of the invention to provide a construction and arrangement in which the scraping structure and cleaning machine may be operated independently and at different rates of speed; and further we provide a construction and arrangement in which electric motors may be employed as the motive power for operating these parts as well as for the operation of the dirty water removal pump and for the control of a make and break switch whereby intermittently to energize the electromagnetic means.

With the foregoing and other objects in view, the invention consists in the mode of treatment, and in the construction and relative arrangement of parts so combined as to coact and co-operate with each other in the performance of the functions and the accomplishment of the results herein contemplated, and comprises in its present evolvement the practical example herein described with reference to the accompanying drawings, wherein similar reference characters designate corresponding parts throughout the several views, and in which:—

Figure 1 is a vertical sectional view and elevation of a sewage treatment apparatus constructed in accordance with our invention, this view below the stationary bridge, being taken on the line 1—1 of Fig. 2, but with the scraper structure turned to a different relative position;

Fig. 2 is a top plan view of the apparatus with parts broken away;

Fig. 3 is a detail sectional view taken on the line 3—3 of Fig. 2;

Fig. 4 is a fragmentary elevation and section on a larger scale disclosing the transmission including the motor means and wiring connections; and Fig. 5 represents an enlarged elevation and section disclosing the arrangement for operating the make and break switch, this view being taken on the line 5—5 of Fig. 2.

While in the accompanying drawings we have disclosed only a single sewage treating unit, it will be understood that in providing for the treatment of the output of a city or municipality, any number of units may be employed as this will not affect the principle of the invention.

Referring now to the drawings, it will be noted that the invention is disclosed as comprising a circular or cylindrical basin 10 which may be built of concrete or any suitable material. The interior of this basin is divided by an annular wall 11 into a relatively large clarification chamber 12 and a surrounding annular canal or filter chamber 13. The bottom 14 of the clarification chamber slopes downwardly from the annular wall 11 to a central circular sump or cavity 15. The annular wall, which separates the clarification chamber 12 from the canal 13, comprises an overflow wall and for this purpose it is of less height than the outer wall 16.

The basin also includes in its construction an outlet well or upwardly extending passage 17 and an opening 18 through the outer wall 16 provides communication between the lower portion of the canal and the lower portion of the well, so that liquid will rise upwardly in the well to the height of the liquid in the canal. At its upper end the outlet well 17 is in communication with a discharge conduit 19. A vertically adjustable overflow gate or weir 20, arranged at the entrance to the discharge conduit 19, commands the flow of liquid from the well and maintains the liquid at the desired level within the canal. In the present embodiment, the means disclosed for vertically adjusting the overflow gate comprises a pedestal 21 arranged upon a platform 22 at the top of the well and in this pedestal is arranged a vertically movable shaft 23 the operation of which is controlled by a hand-wheel 24. The lower end of this shaft is connected with the gate so that through the operation of the hand-wheel in one direction the gate will be moved upwardly, whereas upon the operation of the hand-wheel in a reverse direction the gate will be moved downwardly.

The liquid which passes over the overflow wall 11 is required to flow through a filter bed which is mounted for its support upon suitable ledges 25 and 26 provided respectively in the inner and outer walls 11 and 16. This filter bed is of annular form in agreement with the form of the canal and extends entirely around the same so that all liquid passing over the wall 11 must descend through the filter bed prior to the time it moves through the opening 18 and thence upwardly through the outlet well 17 for discharge over the gate 20. In the present instance, the filter bed comprises a screen 27 which is disposed upon the ledges 25 and 26 and which supports thereon a layer 28 of magnetite or other similar material adapted to be attracted by an electromagnet.

29 designates in general an overhead bridge structure which extends diametrically across the basin at a suitable distance above the top thereof. This bridge is supported at its opposite ends upon suitable abutments 30 which rise from the basin structure from points at the exterior face of the outer wall 16. At a point in line with the center of the sump 15, the bridge supports a fixed bearing 31 in which a shaft 32 is mounted at its upper end portion, the lower end of this shaft having rotative fit in a bearing 33 provided centrally in the sump. A traveling carriage or structure 34 is supported at or near one end upon the shaft 32 so as to rotate about said shaft as a center. The means by which the carriage is thus mounted upon said shaft includes a bearing 35 on the carriage and a collar 36 secured rigidly to the shaft, with the bearing 35 turning upon the shaft and upon the top of the collar. 37 denotes a baffle tube which surrounds the shaft 32 and depends from the carriage so as to turn therewith. The pendant baffle tube extends downwardly into the basin with its open lower end disposed a considerable distance below the surface of liquid which overflows the wall 11 into the canal. The raw sewage liquid is admitted through a supply pipe 38 into the interior of the baffle tube, the delivery end 38' of this supply pipe being bent upwardly as shown in Figs. 1 and 4, so that the sewage liquid will enter the interior of the tube while flowing in an upward direction. By this provision the admitted sewage liquid is required to pass downwardly through the open end of the tube so that it will spread through the body of the liquid contents of the basin without creating undesirable agitation and disturbance in the body of the liquid and more particularly at or near the surface thereof where it is desired to have a smooth, gentle flow in a direction over the overflow wall 11. In this connection, it will readily appear that the baffle tube performs in effect the service of a waterhead for causing the liquid to rise in the basin exteriorly of the tube and hence inducing the tidal flow over the overflow wall; and further, when the canal has been filled with liquid to cause upward movement through the well for discharge over the gate 20.

At this point it may be remarked that within the basin the sewage liquid may be subjected to any suitable, known or approved process of treatment adapted to gather, collect or coagulate the colloidal and suspended matter so that this sludge material, having a higher specific gravity than the water, will settle downwardly to the bottom of the basin while the lighter water and particles will rise to pass over the overflow wall. An efficient process for causing the relatively heavy matter to subside upon the bottom of the basin, is described in U. S. Letters Patent No. 1,877,623 dated September 13, 1932, granted to William C. Laughlin. Through the provision of the supply and baffle tube arrangement herein disclosed, it will be recognized that the heavy matter or solids in the raw sewage, because of their dissemination through the basin contents from a central point below the baffle tube, will be given an opportunity to subside to the bottom of the basin with a minimum of disturbance to the upward rise of the lighter liquids and particles to the level for passing over the overflow wall. It will be recognized that by the vertical adjustment of the gate, the quantity of overflow thereover will be determined, as will also the thickness of the layer of liquid flow over the wall 11. It will also appear that with the basin, canal and well filled to a point where liquid will flow over the gate, the rate of the tidal movement from within the pendant tube may be controlled by adjusting the vertical position of the gate. By properly adjusting the gate, it is possible with this construction and arrangement to secure a smooth, even and continuous layer-like flow of the lighter liquid and particles over the wall 11, leaving the solid material and sludge, which have a higher specific gravity than the water, substantially free and undisturbed to settle upon the bottom of the basin.

The traveling carriage or structure 34 is provided at its outer end with track wheels 39 which turn upon a track rail 40 provided upon the top edge of the outer wall 16. This traveling carriage supports for movement within the canal and adjacent the top of the filter bed a filter bed cleaner or machine 41. This cleaner is supported from the carriage by means of suitable depending beams 42 and it consists of a hollow tank having a transverse dimension which is disposed between but does not contact with the inner and outer walls 11 and 16. The interior of this tank constitutes a dirty water chamber and leading to the interior from the bottom of the tank immediately over the magnetite is an upwardly extending passage (not shown) up through which liquid will rise to overflow into the interior dirty water chamber of the tank, the overflow edge for the water being of course at a level below the level of the surface of the liquid passing over the overflow wall. At the upwardly extending opening leading to its dirty water chamber and immediately over the magnetite, this tank is furnished with an electromagnet 43 adapted to cause agitation of the magnetite for the release of the dirt and dirty water therein which is to rise into the dirty water chamber. This arrangement is such that each time the magnet is energized the magnetite will jump up from the screen. Disposed within the dirty water chamber is a rotary pump 44 by means of which the dirty water is removed from the chamber and discharged through a pipe 45 which, in the present instance, extends to the interior pendant baffle tube so that the dirty water can be recirculated through the basin for purification. For the details of the construction and operation of the magnetic cleaning machine, reference may be had to U. S. Patent No. 1,872,759, granted August 23, 1932, to William C. Laughlin and Abraham B. Asch. It is to be pointed out in this connection that sand may be used as the filtering medium instead of magnetite, and in such case the cleaning machine instead of being equipped with an electromagnet, may be furnished with various mechanical devices whereby to agitate and wash the sand. Examples of suitable sand cleaning machines are illustrated and described in our applications for Letters Patent of the United States, Serial No. 553,527, filed July 28, 1931, and Serial No. 553,528, filed July 28, 1931.

The rotary shaft 32 carries a scraper structure by means of which to move into the sump 15 the sludge and materials which settle upon the bottom of the tank. This scraper structure, as herein disclosed, comprises oppositely extending beams 46 which carry obliquely inclined scraping shoes 47 arranged in succession so that, as the structure revolves, the row or furrow of material scraped inwardly by each outer shoe toward the sump will be engaged by the next succeeding shoe and moved thereby a further distance inwardly toward the sump. The scrapings gathered by each outer shoe are thus advanced to each inner shoe until they are finally deposited in the sump from which they may be removed by a suitable suction pipe 48. The beams 46 are supported in inclined relation so as to be parallel or substantially parallel with the inclined bottom in order to enable the series of shoes to operate effectively upon the sludge deposited upon the inclined bottom. Said beams 46 may be firmly secured in their inclined positions by means of any suitable system of brace bars as 49. Suitable wing members 50 depend from the beams within the sump so as to stir up the sludge therein for withdrawal through the suction pipe 48.

With the rotary scraper structure of our invention, the settlings upon the bottom of the basin may be scraped into the sump while leaving the contents of the basin in a substantially quiescent condition for the ready deposit of the solid matter and sludge upon the bottom of the basin. In order to carry out this purpose, the scraper structure is provided with the described series of inclined scraping shoes so as to keep the bottom of the basin substantially clean while the structure rotates very slowly. In other words, the scraper structure is constructed to perform its function while rotating at a very slow rate of speed in order that there will be a minimum of disturbance in the liquid through which it passes. The filter bed cleaner is moved by the traveling carriage continuously around the circle of the filter bed, and it is to be moved at a rate sufficiently rapid to keep the filter bed clean throughout its extent. The cleaner structure should be moved at a rate that will prevent the filter bed from becoming clogged or from becoming very dirty; for the cleaner the bed is kept the cleaner the effluent will be. For these reasons it is necessary to provide means for moving the traveling carrier independently of the movement of the scraper structure.

Power for rotating the shaft 32, by which to operate the scraper structure, is taken from an A. C. motor 51 whose driven shaft 52 operates suitable reduction gearing disposed within a reduction gear box 53. A shaft 54, driven by the reduction gearing, carries a sprocket gear 54' which is connected by a sprocket chain 55 with a sprocket gear 56 which is secured to the axis of a worm gear 57. Engaged with the worm gear 57 is a large driven gear 58 which is secured to the shaft 32 above the bearing 31.

For causing the carriage 34 to travel upon the track rail 42 while its inner end portion turns around the shaft 32 as a center, there is mounted upon the carriage 34 near the outer end thereof a D. C. motor 59 the driven shaft of which operates suitable reduction gearing located within a reduction gear box 60. A shaft 61 is driven by the reduction gearing in box 60, and this shaft is coupled to an axle 62 which carries one of the track wheels 39. The electric circuit for the motor 59 includes circuit wires 63, 63' which extend to and are connected with the collector rings 64, 64', respectively. The rings 64, 64' encircle the shaft 32 and are supported upon insulation elements 65 which are secured at their lower ends upon the carriage. These collector rings 64, 64' turn against brushes 66, 66', with which are connected the respective circuit wires 67, 67' which lead to a D. C. generator 68. For the operation of the D. C. generator 68, there is provided an A. C. motor 69. A suitable three-phase supply line 70 extends from a suitable source of supply to the A. C. motor 51; and in the present embodiment a three-phase branch line 71 is electrically connected between the supply line 70 and the A. C. motor 69.

The rotary pump 44, disposed in the tank of the cleaner, is driven by a motor 72 which is suitably located upon the cleaner; and the circuit wires 73, 73' for this motor are connected with the wires 63, 63'. For the intermittent operation of the electromagnet 43, we provide a make and break switch 74, the make and break arm 75 of which is reciprocated by a cam 76 turning with a shaft 77 which is rotated by suitable reduction gears disposed in a gear box 78. The power for operating these reduction gears is taken from the motor 59, and the transmission for this purpose includes a sprocket chain 79 which is connected between a sprocket gear 80 upon the driven shaft of the motor and a sprocket gear 81 attached to the driving shaft for the reduction gearing. Suitable circuit wires 82, 82' connect one side of the make and break switch with the wires 63, 63'; while the other side of this switch is connected with the electromagnet 43 by circuit wires 83, 83'.

Under this arrangement, the rotary scraper structure, the traveling carriage which moves the cleaner over the circular filter bed, the pump for removing the dirty water from the cleaner chamber, and the make and break switch for controlling the intermittent operations of the electromagnet, can all be operated concurrently, while at the same time the rotary scraper structure and the traveling carriage can be operated at different rates of speed.

It will be manifest that we have disclosed a novel, practical and satisfactory mode of treating sewage liquid, and a mode which embodies the features and advantages enumerated in the statement of the invention and the above description, and while we have, in the present instance, shown and described a preferred apparatus for carrying out the invention in practice, it is to be understood that the particular construction of the parts of the apparatus is susceptible of modification in various particulars without departing from the spirit or scope of the invention or sacrificing any of its advantages.

We claim:—

1. An apparatus for the clarification of sewage liquid comprising a clarification basin having an overflow wall, a channel receiving the liquid from the overflow wall, a filter bed within the channel dividing the same into an upper cleaning chamber and a lower effluent chamber, a device within the cleaning chamber movable over the bed for cleaning the same and adapted to remove foul liquid resulting from the cleaning operation, and means forming an outlet for the effluent chamber.

2. An apparatus for the clarification of sewage liquid comprising a clarification basin, a surrounding filter chamber receiving a layer of liquid overflow from the basin and provided with a filter bed down through which the received liquid must pass whereby to be filtered, an upright passage in communication with the chamber below the filter bed, and means controlling the discharge of liquid from the passage, said means being effective through the control of the discharge to control the flow of liquid through the chamber and passage for the regulation of the layer of liquid overflowing from the basin.

3. An apparatus for the clarification of sewage liquid having, in combination, a basin, an overflow partition within the basin dividing the interior thereof into a clarification chamber surrounded by a filter chamber which receives the overflow liquid from the clarification chamber, a filter bed in the filter chamber down through which the received liquid must pass whereby to be filtered, means providing a discharge for the filtered liquid, a machine for cleaning the filter bed, a scraper device for cleaning the clarification chamber, and means supported on the basin for supporting and operating the cleaning machine and the scraper device.

4. A filter system for a clarification basin comprising a circumferential overflow wall for the basin and a continuous surrounding canal having a circumferential wall higher than said overflow wall, a continuous filter bed within the canal dividing the latter into an upper section which receives the liquid passing over the overflow wall and a lower effluent section for receiving liquid passing downwardly in the canal and through the bed, mechanism travelling around the basin and means within the upper section movable by said mechanism over the bed for cleaning the bed, and means forming an outlet for the effluent section and effective at a discharge level to maintain a constant level in the canal above the filter bed.

5. A filter system for a clarification basin comprising a continuous surrounding canal and a continuous filter bed within the canal at the outer side of the basin, said basin and canal providing for the overflow of liquid from the former into the latter and said filter bed being at a level below the level of liquid overflow from the basin into the canal, means forming an outlet for the filtered liquid received in the canal below the bed and effective to restrict the downward flow of liquid in the canal and to thereby regulate the overflow from the basin, a carriage moving around the basin and means within the canal moved by said carriage along the bed for cleaning the bed during the filtering operation.

6. A basin construction for clarifying sewage liquid comprising a combination clarification chamber and filter chamber, the latter being continuously separated from the former by a partition having an overflow edge, a filter bed within the filter chamber at a level below the overflow edge of said partition, and a discharge outlet for the filtered liquid in communication at one point with the filter chamber below the filter bed.

7. An apparatus for the clarification of sewage liquid comprising, in combination, a circular clarification basin, a circular filter chamber surrounding the basin and separated therefrom by a partition having an overflow edge, a circular filter bed within the filter chamber below the level of the overflow edge, a rotary scraper device within the basin, a traveling filter bed cleaner within the filter chamber, and electrically controlled means for independently operating said scraper device and said filter bed cleaner.

8. The combination with a clarification basin having an overflow wall, of a canal receiving the overflow from said wall and provided with a filter bed down through which the liquid must pass to be filtered, a movable scraping device for scraping off the residuum subsiding in said basin, a movable machine for cleaning said filter bed, and means for operating said scraper device and cleaning machine concurrently but at different rates of speed.

9. In combination, a circular clarification chamber surrounded by a filter chamber into which a layer of liquid flows from the clarification chamber, a filter bed arranged in the filter chamber, means including a rotary shaft and scrapers carried thereby for scraping the bottom of the clarification chamber, a machine for cleaning the filter bed, a traveling carriage supporting said machine and turning about said rotary shaft as a center, means for rotating said shaft, and means for moving said traveling carriage.

10. In combination, a circular clarification chamber surrounded by a filter chamber into which a layer of liquid flows from the clarification chamber, a filter bed arranged in the filter chamber, means including a rotary shaft and scrapers carried thereby for scraping the bottom of the clarification chamber, a machine for cleaning the filter bed, a traveling carriage supporting said machine and turning about said rotary shaft as a center, motor-operated means for rotating said shaft, motor-operated means for moving said traveling carriage, an electromagnetic device on the cleaning machine and a make and break switch for said device, said switch being connected with the motor-operated means for said carriage for operation thereby.

11. In an apparatus of the class described, a clarification basin having an overflow wall, a canal for receiving liquid overflowing said wall and provided with a filtering medium down through which the received liquid must pass, whereby to be filtered, an upwardly extending passage having communication with said canal below the filtering medium for receiving the filtered effluent, and adjustable means controlling the discharge of the effluent rising in said passage and adapted by its adjustment to control the layer of overflow from the basin into the canal.

12. In apparatus of the class described, a clarification basin having an overflow wall, a waterhead supply through which to admit liquid into the basin, a canal for receiving liquid overflowing said wall and provided with a filtering medium down through which the received liquid must pass, whereby to be filtered, an upwardly extending channel having communication with said canal below the filtering medium for receiving the filtered effluent, and a gate device controlling the discharge of the effluent rising in said canal, said device being adjustable to vary the level of the discharge with respect to the level of the liquid in said head whereby to vary the quantity of liquid overflowing said wall and which is to be filtered.

13. That method of clarifying sewage liquid which includes maintaining an overflow of the lighter liquid rising in a clarification basin, subjecting the overflow liquid while it moves downwardly from the level of the overflow, to the filtering action of a filtering medium, regulating the downward movement carrying through the filtering operation to maintain thereby a constant level above the filtering medium, subjecting the filtering medium to an agitation operation effected upwardly from the top thereof, and removing the dirty water of agitation from the downflow existent between the filtering medium and the constant level.

WILLIAM C. LAUGHLIN.
ABRAHAM B. ASCH.